United States Patent [19]
Bruno et al.

[11] Patent Number: 5,205,395
[45] Date of Patent: Apr. 27, 1993

[54] VIBRATORY MOVEMENT AND MANIPULATION APPARATUS AND METHOD

[75] Inventors: David A. Bruno, San Diego; Mark J. Brooks, Oceanside; Quang Nguyen, San Diego; David M. Brooks, Vista, all of Calif.

[73] Assignee: Electro Scientific Industries, Inc., Portland, Oreg.

[21] Appl. No.: 714,155

[22] Filed: Jun. 10, 1991

[51] Int. Cl.⁵ .............................................. B65G 47/24
[52] U.S. Cl. ................................. 198/389; 198/390; 198/762; 198/767; 198/769; 198/771
[58] Field of Search ............... 198/383, 389, 390, 391, 198/761, 762, 767, 769, 771

[56] References Cited

U.S. PATENT DOCUMENTS

| | | | |
|---|---|---|---|
| 2,109,395 | 2/1938 | Markley | 209/326 |
| 2,236,341 | 2/1941 | Markley | 209/326 |
| 2,385,328 | 9/1945 | Brown et al. | 198/220 |
| 2,629,485 | 2/1953 | Sherwen | 198/220 |
| 3,322,260 | 2/1966 | Schwenzfeier | 198/220 |
| 3,786,912 | 1/1974 | Taylor | 198/220 |
| 4,331,263 | 5/1982 | Brown | 222/63 |
| 4,395,184 | 7/1983 | Braden | 414/417 |
| 4,395,665 | 7/1983 | Buchas | 318/114 |
| 4,496,841 | 1/1985 | Hamer et al. | 318/114 |
| 4,764,695 | 8/1988 | Inoue et al. | 318/114 |
| 4,811,835 | 3/1989 | Bullivant et al. | 198/762 |
| 4,849,156 | 7/1989 | Durow et al. | 376/261 |
| 4,921,090 | 5/1990 | Gregor | 198/761 |
| 4,960,195 | 10/1990 | Yamaguchi et al. | 198/390 X |

FOREIGN PATENT DOCUMENTS

| | | | |
|---|---|---|---|
| 0225208 | 9/1990 | Japan | 198/383 |
| 0239019 | 9/1990 | Japan | 198/383 |

*Primary Examiner*—D. Glenn Dayoan
*Attorney, Agent, or Firm*—Stoel Rives Boley Jones & Grey

[57] ABSTRACT

Methods and apparatus for vibration-generated movement and manipulation, such as transportation, orientation, loading or sorting of materials are provided. At least one electromagnetic coil is disposed to act in a horizontal plane, and another electromagnetic coil may be disposed to act in a vertical plane, imparting two-dimensional vibration to a generally horizontal vibratory surface. Apparatus vibrationally transports parts across a surface while concurrently orienting and sorting them. Reversibility of transport direction is also provided.

20 Claims, 8 Drawing Sheets

VIBRATORY MOVEMENT AND MANIPULATION APPARATUS AND METHOD

TECHNICAL FIELD

The present invention relates to apparatus capable of moving and/or manipulating small items. More specifically, the present invention is directed to vibratory devices that are suitable for transporting, orienting, loading or sorting miniature electronic parts.

BACKGROUND OF THE INVENTION

Vibrating apparatus have previously found utility in material transportation and manipulation applications. For example, vibratory devices have been used in material feeder, fuel rod loading, other material conveyance and material separation applications. A variety of such devices has been developed. These devices generally employ vibrational energy aligned at an angle to the direction of action of gravity to transport part along a horizontal path. Many such devices require a large number of moving parts to generate vibratory movement or specialized control mechanisms to insure that an appropriate vibrating frequency is maintained.

One vibratory apparatus design is embodied in U.S. Pat. No. 3,786,912 issued to Taylor. This vibratory apparatus features two driven masses, an action mass and a reaction mass, configured to have coincident centers of gravity. In this design, vibration is achieved by driving the two masses in an offset manner. U.S. Pat. No. 3,322,260 issued to Schwenzfeier also discusses a two driven mass system, a vibrating head and a drive head. The primary drawback of these designs is that movement of the parts is unidirectional.

U.S. Pat. No. 4,764,695 issued to Inoue et al. is directed to devices that employ a single driven mass. Specifically, the Inoue et al. device includes a vibrating member capable of orbital movement about a vertical axis without substantial rotational movement; a multileaf spring support means configured to form a vibration system having a substantially fixed spring constant in all directions in the plane of vibration of the vibrating member; and at least three armatures disposed around the vertical axis and confronted by electromagnets driven by multiphase a.c. current. At least three drive units are required to implement this design. One constraint of this design is that transport of parts is directed radially outwardly due to the conical shape of dispersion table 17. Moreover, actual transport of parts is driven exclusively by gravity, since the vibration serves only to minimize friction between the parts and the dispersion table.

Other prior art devices using vibrational technology in material movement or manipulation employ complex control mechanisms to achieve the desired vibrational characteristics. For example, U.S. Pat. No. 4,811,835 issued to Bullivant et al. involves vibratory material feeders characterized by controlled vibrational movement. The Bullivant et al. device includes a drive means for applying a substantially sinusoidal electrical drive wave to a vibrating mechanism (an electromagnetic vibratory actuator means); control of the frequency of the drive wave form to drive the actuator in mechanical resonance; and control of the amplitude of the drive wave form to discharge materials at a desired rate.

U.S. Pat. No. 4,921,090 issued to Gregor discloses vibratory material conveyors, characterized by specific control features. The controls of the Gregor apparatus include means for periodically turning the alternating current power supply to an electromagnetic driving means on and off; and user control means for setting the duration for timed alternating current bursts and for tuning the electromagnetic driving means at or near the natural harmonic frequency of the vibrating conveyor.

U.S. Pat. No. 4,331,263 issued to Brown discusses a vibratory feeder system with a control mechanism capable of generating vibratory movement having a predetermined amplitude and/or corresponding to the mechanical resonant frequency of the feeder. This control mechanism includes a means for sensing the third harmonic of the drive current signal in the electromagnetic driver; and/or amplitude control means responsive to the third harmonic for determining whether the amplitude of the vibrating feeder corresponds to a predetermined amplitude; and/or frequency control means responsive to the third harmonic for determining whether the frequency corresponds to the mechanical resonant frequency of the feeder.

U.S. Pat. No. 4,395,665 issued to Buchas discusses a control mechanism for vibrating a member at its resonant frequency. The Buchas control mechanism includes a vibratory movement detection means capable of producing a signal having the resonant frequency of the member; a means responsive to the detection means to induce the driver to vibrate the member at its resonant frequency. Such control mechanisms contribute to the complexity of the vibratory transport devices employing them. Again, this prior art device is capable of unidirectional part transport only.

When orientation as well as transportation of materials is desired, prior art devices employing vibrational energy aligned at an angle to the direction of action of gravity are limited to orienting parts along the transport plane. A typical application of such a vibrational transport and orientation system is to present one or more parts for subsequent processing in a standard horizontal orientation. This design therefore limits the subsequent processing that may be conducted in conjunction with these vibratory transportation/orientation devices. This prior art system features unidirectional part transport A different system has been used when part orientation is additionally required prior to transfer from the transport plane. A plate loader manufactured by Palomar Systems and Machines, Inc. (Escondido, Calif.), for example, employs vibrational energy to randomize the motion of parts, so that they are suitably oriented and fall through sized orifices into a receiving plate. Transportation of the parts across the plate is assisted by a human or robotic operator that rotates the assembly about the horizontal plane, allowing gravity to transport the parts across the face of the plate. A vacuum may also be drawn below the receiving plate to facilitate orientation of the parts. This system is described, for example, in U.S. Pat. No. 4,395,184. Although this system is generally satisfactory, human operator assistance increases the labor required to operate the device. Moreover, a human operator may damage delicate electronic components by rotating or otherwise handling the receiving plate and reservoir containing the components too aggressively.

SUMMARY OF THE INVENTION

Apparatus of the present invention provide movement and manipulation of multiple individual parts. More specifically, transportation and/or orientation and/or sorting of miniature electronic parts constitute functions of apparatus of the present invention. An important feature of apparatus of the present invention is reversibility of transport direction.

Apparatus of the present invention have no continuously moving components. Only small vibrational movements of potential energy storing components of the vibratory apparatus of the present invention are performed. In other embodiments of the present invention not employing such means, component movement is even further minimized. As a result, component wear of apparatus of the present invention is minimized. In addition, lubrication is unnecessary and long component life-times are achievable. Apparatus of the present invention are also smaller in size and less complex than other devices performing like functions.

More specifically, the present invention provides vibrating apparatus capable of vibrationally transporting parts across a surface while concurrently orienting or sorting them. Orientation may be accomplished, for example, by transporting parts along a vibratory surface or a surface adjacent thereto having holes or sized orifices formed therein, where the orifices are configured to permit parts to become lodged therewithin only in a specific orientation. Sorting may be accomplished, for example, by transporting parts along a vibratory surface or a surface adjacent thereto having holes or sized orifices formed therein, where the orifices are configured to pass parts of a certain size therethrough. Apparatus of the present invention may also be used for part transport only.

The vibratory apparatus of a preferred embodiment of the present invention includes at least one electromagnetic coil disposed to act in a horizontal plane and at least one electromagnetic coil disposed to act in a vertical plane, thereby imparting two-dimensional vibration to a generally horizontal vibratory surface. For example, two horizontal coils and one vertical coil or two horizontal and two vertical coils may be employed to generate two dimensional vibration. Another embodiment of the present invention features one dimensional vibration of a generally horizontal vibratory surface in a plane disposed between a horizontal plane and a vertical plane. In embodiments of the present invention involving vibration having two directional components, the part transport path is dictated by the phase relationship of those vibration components. The direction of part movement may therefore be altered by changing that phase relationship. In general, higher amplitude vibrations impart more energy to the parts as they move along the transport plane. This increased energy produces localized random motion of the parts, but the general movement of parts remains unidirectional.

In all of the aforementioned embodiments, vibration may be achieved through coil/armature interaction in one direction in combination with coil/armature return. Alternatively, the coil-generated unidirectional motion may create potential energy that is stored by a potential energy storing means. As a result, coil/armature actuation may be combined with the release of the stored potential energy by the potential energy storing means to generate vibratory motion.

The present invention also provides methods of material movement and manipulation. More specifically, methods of miniature electronic part transportation, orientation or sorting are provided. Part loading may constitute a concurrent or subsequent goal of part orientation or a subsequent goal of part sorting. As a result, the methods of the present invention also optionally include a loading step.

DESCRIPTION OF PREFERRED EMBODIMENTS

The present invention provides methods and apparatus for movement and manipulation of small items, such as miniature electronic parts, along a surface. Movement connotes operations such as vibrationally-generated transport, while manipulation connotes orienting, loading and sorting operations, for example. The manipulating operations may be achieved in combination with transport alone, or in combination with transport and one or more other manipulating operations.

While the present invention is described in terms of the movement and manipulation of "parts," a practitioner in the art will readily appreciate that the apparatus and methods of the present invention would also function adequately to move and manipulate other small items or materials.

The vibratory motion of the apparatus of the present invention necessary to carry out its part movement and manipulation (e.g., transportation, orientation, sorting, loading and the like) functions is preferably generated by electromagnetic coils driven by electric current. An exploded isometric view of an embodiment of the present invention capable of generating the requisite vibratory motion is depicted in FIG. 1.

Figure 1:
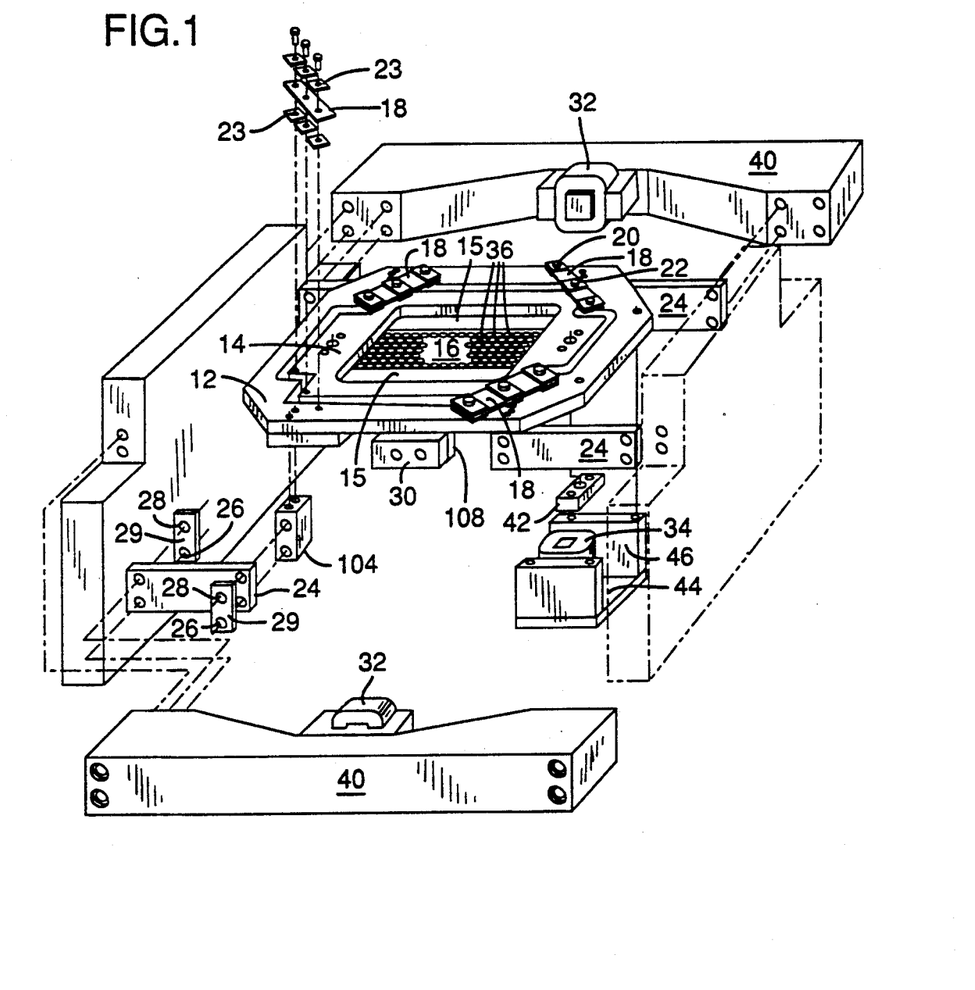
FIG. 1 is a partially exploded isometric view of a vibratory apparatus of the present invention.

FIG. 1 shows a vibratory mechanism 10 of the present invention that includes an outer frame 12 that vibrates in the horizontal plane (a plane parallel to the base of the apparatus of the present invention). A support frame 14 vibrates vertically (in a plane perpendicular to the horizontal plane) within outer frame 12 and supports a vibratory surface 16. This X-Y (horizontal-vertical) plane in combination with a Z axis orthogonal thereto provides a reference, rendering directional terms, such as above, below, front, rear and the like, meaningful in the context of this description. For example, "above" connotes a location at a point having a higher value along the vertical (Y) axis. Another convention employed in this description is that length refers to the largest dimension of a component regardless of component orientation, width the next largest and thickness the smallest.

In the embodiment shown in FIG. 1, vibratory surface 16 is a carrier plate for miniature electronic parts. A plurality of vertically oriented potential energy storing means 18, such as leaf springs, are affixed to outer frame 12 through attachment means 20, such as a bolt, and are affixed to support frame 14 through attachment means 22, such as a bolt. Preferably, a set of spacers 23 is disposed between vertically oriented potential energy storing means 18 and outer frame 12 and between vertically oriented potential energy storing means 18 and support frame 14. In addition, a plurality of horizontally oriented potential energy storing means 24, such as leaf springs, are operably connected to outer frame 12 through attachment means 26, such as a bolt, and are affixed to a rigid fixture 40 of the vibratory apparatus of the present invention through attachment means 28. Preferably, a set of spacers 29 is disposed between horizontally oriented potential energy storing means 24 and outer frame 12 and between horizontally oriented potential energy storing means 24 and rigid fixture 40.

At least one metallic member 30, oriented for operating in conjunction with a horizontal coil 32 that is operably connected to rigid fixture 40 of the vibratory apparatus of the present invention is operably connected to outer frame 12. Metallic member 30 is operably connected to outer frame 12 by any convenient means known in the art to accomplish that task, such as a bolt or a block forming a horizontal armature base 108. Metallic member 30 functions as an armature with respect to horizontal coil 32. Horizontal coil 32 is likewise operably connected to rigid fixture 40 by any convenient means known in the art to accomplish that task, such as a bolt A two metallic member 30/two horizontal coil 32 embodiment of vibratory mechanism 10 of the present invention is preferred.

Likewise, at least one metallic member 42, oriented for operating in conjunction with a vertical coil 34 that is operably connected to outer frame 12, is operably connected to support frame 14 at a position above vertical coil 34 (i.e., metallic member 42 and vertical coil 34 are displaced from each other in the vertical direction). This operable connection may be accomplished, for example, though affixation of metallic member 42 to the underside of support frame 14 by any convenient means known in the art for accomplishing such a connection. Metallic member 42 functions as an armature with respect to vertical coil 34. Vertical coil 34 is operably connected to outer frame 12 of the vibratory apparatus of the present invention in any convenient manner known in the art therefor. An exemplary operable connection is shown, where vertical coil 34 is supported on a base 44, and base 44 is affixed to support frame 14 through a plurality of vertical coil supports 46. Vertical coil 34, base 44, supports 46 and support frame 14 assembly may be interconnected by any convenient means therefor. A two metallic member 42/two vertical coil 34 embodiment of vibratory mechanism 10 of the present invention is preferred.

In the embodiment of the present invention shown in FIG. 1, horizontal coils 32 interact with metallic members 30 to achieve vibrational motion in a first direction within the horizontal plane. This operation causes horizontal potential energy storing means 24 to store potential energy, the release of which results in movement within the horizontal plane in a direction substantially opposite to the first direction. Horizontal coil 32 interacts with metallic member 30 when coil 32 is energized, and potential energy is released by horizontally oriented potential energy storing means 24 when coil 32 is de-energized. A similar phenomenon is observed with respect to vertical coils 34, metallic members 42 and vertical potential energy storing means 18.

Alternatively, horizontal coils 32 and vertical coils 34 may generate motion in both the first and second directions. This may be accomplished by employing an energization/opposed energization pattern, rather than an energization/de-energization pattern in combination with potential energy storing means 18, 24. When a single coil is used to displace the surface in both the first and second directions in a horizontal plane, metallic block 30 is provided as a permanent magnet or an electromagnet. Also, coils having offset energization/de-energization patterns may also be employed, for example, such that a first coil 32 or 34 is energized and acts on one metallic member 30 or 42 in a first direction for a specified time period, and is then de-energized at substantially the same time as a second coil 32 or 34 is energized and acts on the same or a different metallic member 30, 42 in the second direction.

Figures 4, 5:
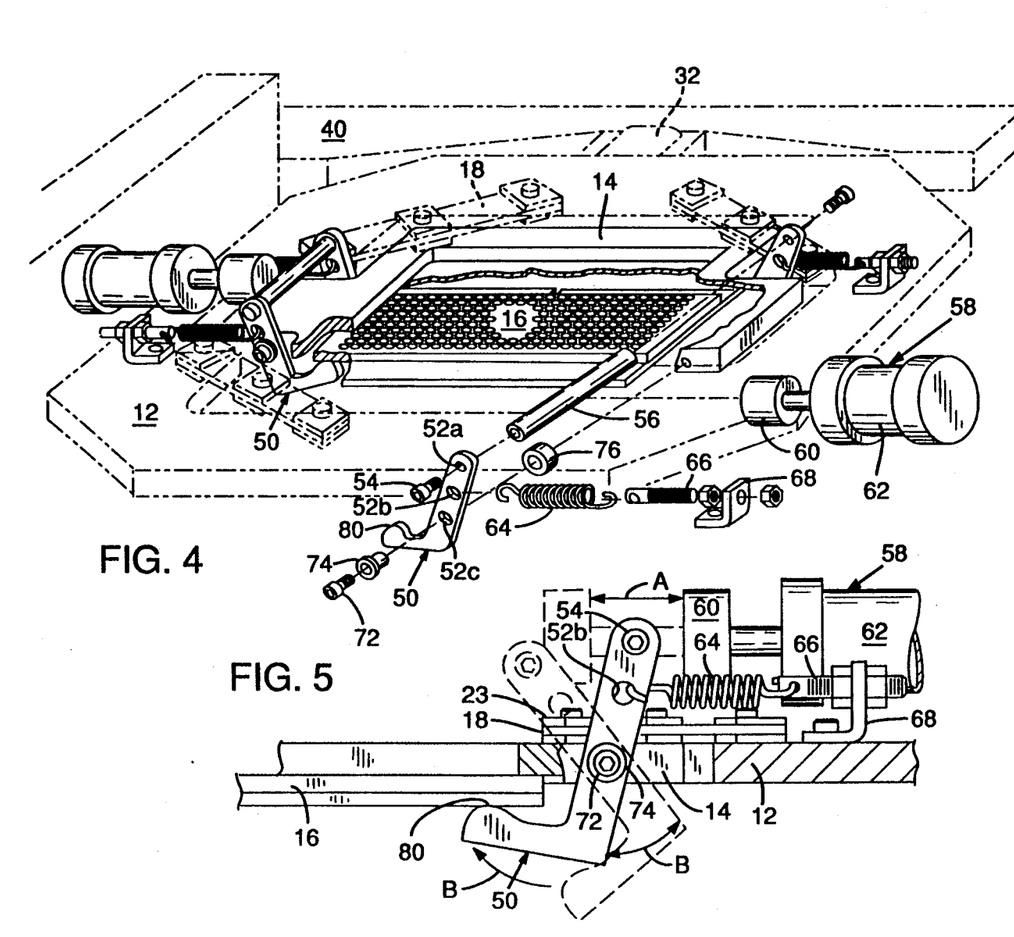
FIG. 4 is a partially exploded, isometric view of a preferred method for linking the vibratory surface to the support frame.
FIG. 5 is a partially cross-sectional side view of a preferred arrangement for linking the vibratory surface to the support frame.

Outer frame 12 is configured to cooperate primarily with support frame 14, vertically oriented potential energy storing means 18, horizontally oriented potential energy storing means 24 and vertical coil 34. Any configuration or material capable of such cooperation may be used in forming outer frame 12. The overall size of outer frame 12 (the outer peripheral area thereof) may also be chosen in an effort to meet size constraints on the apparatus of the present invention. FIGS. 4 and 5 illustrate a preferred mechanism for operably connecting outer frame 12 and support frame 14, which mechanism is discussed below.

A preferred configuration of outer frame 12 (FIG. 2) involves a relatively flat plate-like member, an inner periphery that is a polygon having 12 unequal sides in the general shape of a cross or a rectangle with two protrusions at its lengthwise ends. Outer frame 12 is connected to vertically openings 100a and 100b. Connection of outer frame 12 to vertical coil supports 46 is made at openings 102. Operable connection to horizontally oriented potential energy storing means 24 is made through a horizontal mount 104 at locations 106, and operable connection to metallic member 30 is made through a horizontal armature base 108 at locations 110. Openings in outer frame 12 may be machined therein using known techniques, and the operable connections described above may be made with known fastening means, such as bolts.

Figure 2:
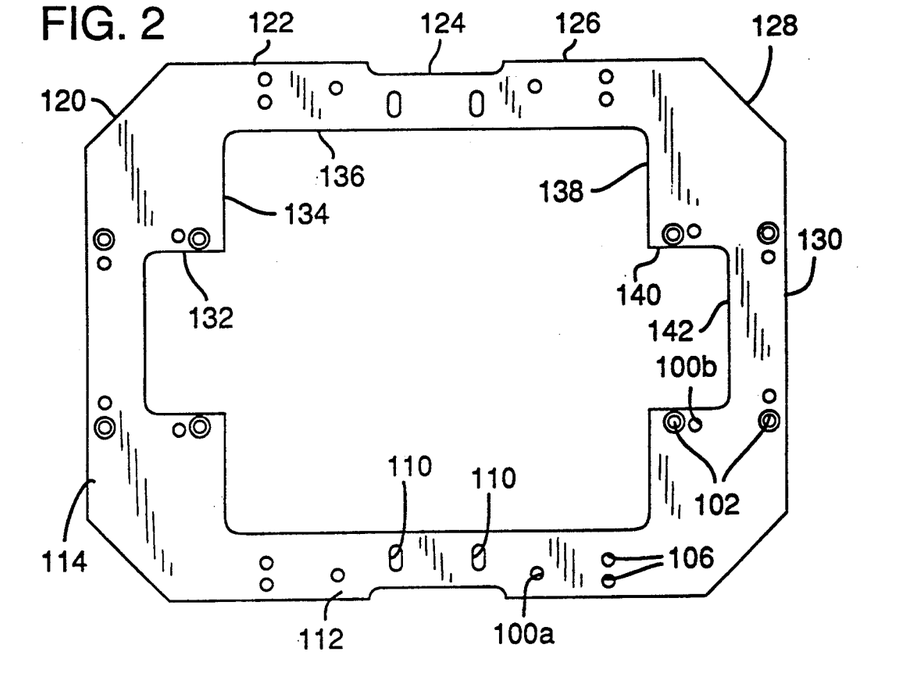
FIG. 2 is a top view of a preferred embodiment of an outer frame component of the apparatus of the present invention.

For example, outer frame 12 may be about 13.5 inches wide, about 16.9 inches long and about 0.5 inch thick. When located on a lengthwise wall 112 of outer frame 12, openings 100a are positioned about 0.6 inch and 6.0 inches from the outermost edges of lengthwise wall 112 and a widthwise wall 114, respectively, of outer frame 12. When located on widthwise wall 114, respectively, of outer frame 12, openings 100a are positioned about 0.5 inch and about 5.0 inches from the outermost edges of widthwise wall 114 and the lengthwise wall 112. Openings 100b are located about 2.3 inches and 4.3 inches from the outer periphery of widthwise and lengthwise walls 114, 112, respectively, of outer frame 12. Outer frame 12 preferably includes four openings 100a and four openings 100b.

Openings 102 are located about 4.5 inches from the outermost edge of lengthwise walls 112 of outer frame 12, and about 0.5 inch and about 2.7 inches from the outermost edge of widthwise walls 114. Outer frame 12 preferably includes eight openings 102, grouped in four sets of two. Openings 102 within a single set are preferably located about 2.2 inches apart in the length direction.

Locations 106 are positioned about 4.3 inches from the outermost edge of widthwise walls 114 of outer frame 12 and about 0.4 inch and about 0.9 inch from the outermost edge of lengthwise walls 112. Outer frame 12 preferably includes eight locations 106, grouped in four sets of two. Preferably locations 106 within a single set are separated from each other in the width direction by about 0.5 inch.

Locations 110 are preferably slots machined into outer frame 12. The centers of, for example, 0.28 × 0.53 inch slots or locations 110 are positioned about 7.4 inches and 9.5 inches from the outermost edge of widthwise wall 114 and about 1.0 inch from the outermost edge of lengthwise wall 112. Outer frame 12 preferably includes four locations 110, grouped in two sets of two. Locations 110 within a single set are preferably separated by about 2.1 inches in the width direction.

The outer periphery of outer frame 12 includes a first 45° angle portion 120 of about 2.0 inches in length; a first 0° angle portion 122 of about 4.7 inches in length; a shallow cut out portion 124 of about 0.25 inch maximum width and about 3.5 inches in length, characterized by interior rounded edges; a second 0° angle portion 126 of substantially equivalent length to first 0° angle portion 122; a second 45° angle portion 128 of substantially equivalent length and opposite inclination with respect to first 45° angle portion 120; and a 90° angle portion 130 of between about 9.0 and 9.6 inches; and a second set of such portions extending around the periphery.

The inner periphery of outer frame 12 includes a first 0° angle portion 132 of about 1.8 inches in length, having a slightly curved forward edge and beginning at a location displaced 1.5 inches from the outermost edge of widthwise wall 114 and about 4.75 inches from the outermost edge of lengthwise wall 112; a first 90° angle portion 134 ending in a slightly curved edge and extending toward the nearest lengthwise wall 112 for a distance of about 3.1 inches; a second 0° angle portion 136 ending in a slightly curved edge and exhibiting a length of about 10.25 inches long; a second 90° angle portion 138 of substantially equivalent length and of opposite inclination with respect to first 90° angle portion 134; a third 0° angle portion 140 having a slightly curved edge and of substantially equivalent length to first 0° angle portion 132; a third 90° angle portion 142 having a slightly curved ending edge, inclined in substantially the same manner as second 90° angle portion 138 and exhibiting a length of about 4.0 inches; and a second set of such portions extending about the periphery.

Ferrous metal may be used to form outer frame 12, thereby permitting outer frame 12 to interact directly with horizontal coil 32 in generating vibratory motion. Ferrous metals, such as iron, steel and the like, may be used for this purpose. If outer frame 12 does not directly interact with horizontal coil 32, other materials, such as aluminum or the like may be used to form outer frame 12. A preferred material for use in forming outer frame 12 is aluminum, because it exhibits light weight and low inertial properties. A practitioner in the art is capable of designing or choosing as well as implementing an appropriate outer frame 12.

Support frame 14 is configured to cooperate with outer frame 12, vibratory surface 16, vertically oriented potential energy storing means 18 and metallic member 42. Any configuration or material capable of such cooperation may be used in forming support frame 14.

A preferred configuration of support frame 14 (FIG. 3) involves a relatively flat plate-like member, having an outer periphery that is a polygon having 12 unequal sides in the general shape of a cross, having a generally rectangular portion 150 with two smaller rectangular protrusions 152 protruding in the lengthwise direction from each widthwise side 154 of rectangular portion 150, and a rectangular inner periphery. Preferably, support frame 14 exhibits rounded edges and is generally square in shape (i.e., the inner periphery is a square, while the outer periphery is generally square with rectangular protrusions 152 extending in the lengthwise direction from widthwise walls 154). The area bounded by the inner periphery of support frame 14 may be smaller than the surface area of vibratory surface 16. In this embodiment, vibratory surface 16 can be placed upon and be supported by support frame 14. Such placement and support may be direct or indirect (i.e., vibratory surface 16 may be placed in direct contact with support frame 14 or may indirectly contact support frame 14 through an intermediate component. Alternatively, the area bounded by the inner periphery of support frame 14 may be larger than the surface area of vibratory surface 16. In this embodiment, support frame 14 is operably connected to vibratory surface 16 or an intermediate component through any convenient means therefor capable of transmitting vibratory motion. A preferred mechanism utilized to achieve this operable connection is depicted in FIGS. 4 and 5 and is discussed below.

Figure 3:
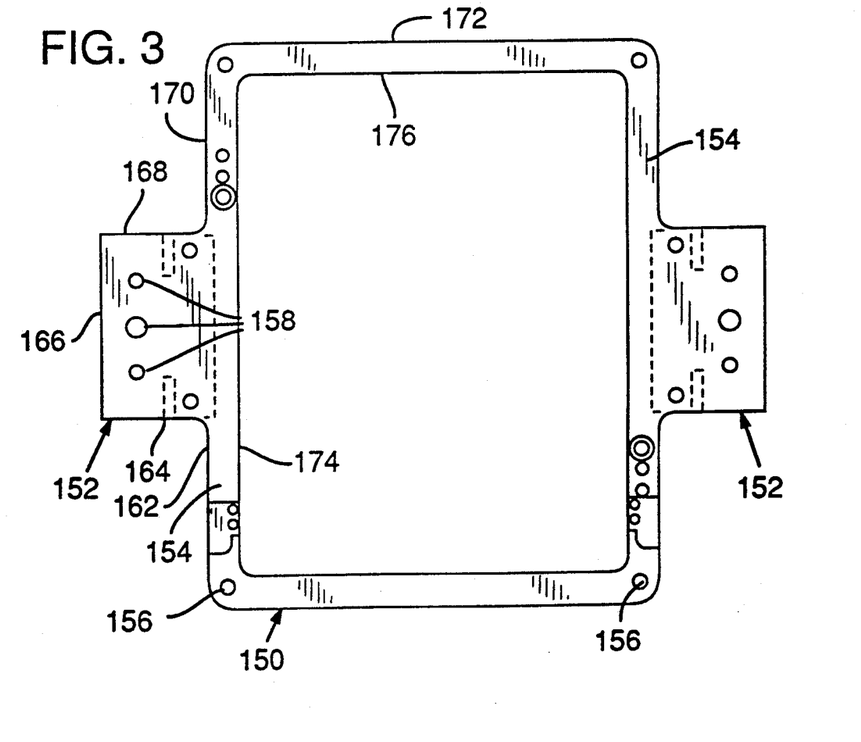
FIG. 3 is a top view of a preferred embodiment of a support frame component of the apparatus of the present invention.

Support frame 14 is operably connected to vertical potential energy storing means 18 through an opening 156. Operable connection between support frame 14 and metallic member 42 is made through openings 158. Openings in support frame 14 may be machined therein using known techniques, and the operable connections described above may be made with known fastening means, such as bolts.

For example, support frame 14 may have a width of from about 9.1 inches to 9.3 inches, a length (at the point of greatest length, i.e., including the length of protrusions 152) of about 13.0 inches, and a thickness of about 0.5 inch. Preferably, the rectangular portion of support frame 14 exhibits a width of about 9.2 inches and a length of about 9.25 inches.

Openings 156 are centered at a corner of rectangular portion 150 of support frame 14 and displaced about 0.3 inch from the outer periphery of both widthwise wall 154 and a lengthwise wall 160 of rectangular portion 150. Support frame 14 preferably includes four openings 156.

Openings 158 are located on rectangular protrusions 152 of support frame 14. Openings 158 are centered at a position about 0.55 inch from the outermost rectangular protrusion 152 length wall. Support frame 14 preferably includes six openings 158, grouped in two sets of three. Openings 158 within a single set are located about 0.75 inch from each other and the widthwise walls of rectangular protrusion 152. Also preferably, central opening 158 is larger in diameter than openings 158 disposed to the either side thereof.

The outer periphery of support frame 14 includes a first 90° angle portion 162 having rounded forward and rearward edges and extending about 3.1 inches; a first 0° angle portion 164 extending about 1.8 inches and protruding from rectangular portion 150 in the length direction to form an edge of rectangular protrusion 152; and a second 90° angle portion 166 of about 3.0 inches in length; a second 0° angle portion 168 extending for substantially the same distance as first 0° angle portion 164 in a direction opposite that of first 0° angle portion 164 and ending in a curved edge; a third 90° angle portion 170 of substantially the same length as first 90° angle portion 162 and ending in a curved edge; a third 0° angle portion 172 of about 9.25 inches in length ending in a curved edge; and a second set of such portions. In this example, first and second 0° angle portions 164 and 168 and second 90° angle portion 166 form rectangular protrusion 152.

The inner periphery of support frame 14 includes a 90° angle portion 174 beginning and ending with curved edges and extending for about 8.2 inches; a 0° angle portion 176 ending with a curved edge and extending for about 8.2 inches; and a second set of such portions. In the above descriptions of the outer and inner peripheries of outer frame 12 and support frame 14, a peripheral portion that is contiguous with a peripheral portion culminating in a curved edge exhibits a curved forward edge.

Support frame 14 cooperates with outer frame 12 through vertically oriented potential energy storing means 18. As described previously, vibratory surface 16 is in direct or indirect contact with support frame 14, and a preferred mechanism therefor is shown in FIGS. 4 and 5 and described below. Since vertically oriented potential energy storing means 18 are operably connected to both outer frame 12 and support frame 14, vibratory surface 16 is subject to both horizontal and vertical vibratory forces generated by horizontal and vertical coils 32, 34.

Ferrous metal may be used to form support frame 14, thereby permitting support frame 14 to interact directly with vertical coil 34 in generating vibratory motion. Ferrous metals, such as iron, steel and the like, may be used for this purpose. A practitioner in the art is capable of designing or choosing as well as implementing an appropriate support frame 14.

Optionally, one or more reservoirs 15 may be included along the outer area of support frame 1 beyond the outer periphery of vibratory surface 16, as shown in FIG. 1. Reservoirs 15 allow vibratory surface 16 to be removed from the apparatus of the present invention without spilling parts located on vibratory surface 16. More specifically, parts travel from one reservoir 15 across vibratory surface 16 to the other reservoir 15 during operation of the apparatus of the present invention to achieve, for example, loading of a chip carrier plate-type vibratory surface 16. In this manner, a "filled" vibratory surface 16 may be removed and replaced by an "empty" vibratory surface 16 while the parts that were not loaded thereon are located in reservoirs 15 to avoid part spillage.

Vibratory surface 16 may be used for transport only or may be used to accomplish other functions of the apparatus of the present invention. Vibratory surface 16 of the present invention includes any continuous surface (i.e., a component that is not a frame member) to which horizontal and vertical coils 32, 34 impart vibratory motion. Consequently, vibratory surface 16 may be a flat plate, a chip carrier plate, a flat plate having an orificed surface adjacent thereto, or the like. Alternatively, vibratory surface 16 may be a surface upon which a second orificed vibratory surface, such as a chip carrier plate, is disposed.

When used for transport only, vibratory surface 16 need only cooperate with support frame 14 and outer frame 12, such that vibratory surface 16 vibrates in the horizontal and vertical planes. Any configuration or material capable of such cooperation may be used in forming vibratory surface 16. Alternatively, vibratory surface 16 may be formed of metal and configured to cooperate directly with coils 32, 34.

A preferred configuration for vibratory surface 16 used solely for transport is as a part of a unitary structure with support frame 14. In this embodiment, vibratory surface 16 and support frame 14 are machined as a single component. In general, the vibratory surface 16 portion of a composite component or a stand alone vibratory surface 16 exhibit a flat, plate-like structure. For example, a composite portion or separately structured vibratory surface 16 may exhibit a length of about 8.9 inches and a width of about 3.25 inches. Preferred materials for forming a transporting vibratory surface 16 are metals, plastics, glasses, ceramics, epoxies and the like. A practitioner in the art is capable of designing or choosing as well as implementing an appropriate vibratory surface 16 useful for part transport.

When used for orientation and/or loading and/or sorting, vibratory surface 16 or an adjacent surface thereto (not shown) includes at least one orifice 36. Preferably, a plurality of orifices 36 are included. For orientation purposed, orifices 36 are configured such that parts may deploy therein in a single orientation only. The configuration of orienting orifices 36 will, of necessity, depend on the size and shape of the parts to be oriented. For example, orifices 36 of circular general shape and 0.070" diameter are suitable for lengthwise orientation of ceramic chip capacitors having dimensions of 0.120" length by 0.06" width by 0.03" thickness. A preferred orienting vibratory surface is a test plate manufactured by Palomar Systems and Machines, Inc., Escondido, Calif. Preferred test plates are described, in detail, in U.S. Pat. No. 4,406,373.

For sorting purposes, orifices 36 are configured such that parts of certain size(s) or configuration(s) are capable of passing therethrough. The configuration of sorting orifices 36 will, of necessity, depend on the size and shape of the parts to be sorted. Preferred vibratory sorting surfaces include screens and sheets of perforated metal. Suitable vibratory sorting surfaces may also be constructed from plastics, ceramics, wood and the like.

A preferred configuration for vibratory surface 16 used for transportation and orienting, loading or sorting is a test plate manufactured by Palomar Systems and Machines, Inc., Escondido, Calif. Preferred materials for forming a vibratory surface 16 performing a plurality of operations are metals, plastics, glasses, epoxies and ceramics. A practitioner in the art is capable of designing or choosing as well as implementing appropriate vibratory surfaces 16.

FIGS. 4 and 5 illustrate a preferred mechanism and methodology for clamping vibratory surface 16 to support frame 14 and for connecting outer frame 12 and support frame 14. The embodiment illustrated in FIGS. 4 and 5 is advantageous in that it permits rapid and easy exchange of vibratory surfaces.

A plurality, preferably four, of generally L-shaped clamp arms 50 having openings 52a, 52b and 52c machined along the longer portion thereof provide the means to reversibly clamp vibratory surface 16 and support frame 14. Opening 52a of a first clamp arm 50 allows an attachment means 54 to pass therethrough to affix one end of a bar clamp 56 to clamp arm 50. Bar clamp 56 is sized and configured to extend along the width of vibratory surface 16, such that bar clamp 56 may be affixed to a second clamp arm 50 through an associated attachment means 54/opening 52a mechanism. Bar clamp 56 is actuated by an actuator 58 composed of a contact means 60 and an actuating means 62.

One end of a spring 64 passes through opening 52b. The other end of spring 64 passes through an opening in a fastener 66 capable of operable connection to an L-shaped bracket 68, which is affixed to outer frame 12. As shown in FIGS. 4 and 5, for example, the operable connection between fastener 66 and L-shaped bracket 68 and the affixation between L-shaped bracket 68 and outer frame 12 may be achieved through one or more bolts, although other conventional means to accomplish these functions may also be used.

Actuator 58 is affixed to rigid fixture 40 at actuating means 62. Contact means 60 may be of any convenient design, such as the nylon pusher depicted in FIGS. 4 and 5. Similarly, actuating means 62 may be of any convenient design, such as the depicted air cylinder. Actuator 58 contacts bar clamp 56 only when it is extended. Under vibrating conditions, actuator 58 is retracted and contact means 60 is not in contact with bar clamp 56. Outer frame 12 is therefore connected to vibratory surface 16 only through springs 64 and clamp arms 50.

An attachment means 72 is operably connected to a bushing 74, and the attachment means 72/bushing 74 arrangement passes through opening 52c and a spacer 76. Attachment means 72 terminates in operable connection with support frame 14. As can best be seen with respect to FIG. 5, outer frame 12 is operably connected to support frame 14 through horizontal leaf spring 18 and through bracket 68, fastener 66, spring 64, clamp arm 50 and attachment means 72.

Support frame 14 is reversibly clamped to vibratory surface 16 through an actuation/return mechanism that is best shown in FIG. 5. To clamp vibratory surface 16 into place, contact means 60 is actuated by actuating means 62, causing contact means 60 to move in the direction of arrow "A" of FIG. 5 to a second contact means 60 position indicated by dotted lines. This movement of contact means 60 causes clamp arm 50 to move in the direction of arrows "B" of FIG. 5 to a second clamp arm 50 position indicated by dotted lines. Following movement of clamp arm 50, vibratory surface 16 can be moved into proper alignment with support frame 14. Actuating means 62 is now deactivated, allowing spring 64 and bar clamp 56 to move clamp arm 50 in the reverse direction along arrow B into firm contact with vibratory surface 16. Vibratory surface 16 is now clamped to support frame 14 by clamp arm 50, as shown by the solid clamp arm 50 and contact means 60 positions in FIG. 5.

Clamp arms 50 must be sized and configured such that each clamp arm 50 moves, in response to spring 64, into firm contact with vibratory surface 16 to clamp vibratory surface 16 to support frame 14, and moves in response to actuator 58 out of contact with vibratory surface 16 to allow vibratory surface 16 to be removed and replaced. Preferably, clamp arm 50 is formed in a modified L-shaped structure, as shown in FIGS. 4 and 5, with a lip 80 providing the contact point between clamp arm 50 and vibratory surface 16. A practitioner in the art would be able to choose an appropriate clamp arm 50 from those that are known and commercially available or to design such a clamp arm 50.

The other individual components of the mechanism shown in FIGS. 4 and 5 are known and commercially available. A practitioner in the art could implement the depicted mechanism or a mechanism that is functionally equivalent thereto.

Potential energy storing means 18 and 24 of the present invention may be any component capable of storing the amount of potential energy produced in generating vibrational motion in accordance with the present invention and oriented to operate in an appropriate plane. Consequently, appropriate potential energy storing means 18, 24 are springs, such as leaf springs, fiberglass plates and the like. Leaf springs constitute the preferred potential energy storing means 18, 24 of the present invention.

Potential energy storing means 18 and 24 of the present invention are positioned to operate in appropriate planes. As shown in FIG. 1, vertically oriented leaf springs 18 are located in a vertical plane of vibrating mechanism 10, and horizontally oriented leaf springs 24 are located in a horizontal plane of vibrating mechanism 10. Consequently, vertically oriented leaf springs 18 and horizontally oriented leaf springs 24 are located in vertical and horizontal planes, respectively, of vibratory apparatus of the present invention including vibratory mechanism 10.

Potential energy storing means 18 and 24 of the present invention are configured and formed to permit the storage of potential energy and the release of that stored energy. Any configuration capable of such storage and release may be used for this purpose, with rectangular leaf springs preferred. For example, leaf springs useful as vertically oriented potential energy storing means 18 are about 6.0 inches long, about 0.75 inch wide and about 0.13 inch thick and have three openings machined therein. These openings are disposed about 2.6 inches apart along the length of the spring, with the peripheral openings located about 0.4 inch from the lengthwise ends of the spring. Leaf springs useful as horizontally oriented potential energy storing means 24 are about 5.0 inches long, about 2.0 inches wide and about 0.25 inch thick and have four openings machined therein. Each opening is located at a corner of the spring, about 0.5 inch from both the lengthwise and the widthwise edges thereof. Generally, two potential energy storing means 18 or 24 will be deployed for each coil 32 and 34. Preferably, four horizontally oriented potential energy storing means 24 and four vertically oriented potential energy storing means 18 are employed.

In addition, any material capable of potential energy storage and release, such as metal, fiberglass, and the like, may be used to form potential energy storing means 18, 24. A practitioner in the art is capable of designing or choosing as well as implementing appropriate potential energy storing means 18, 24.

Attachment means 20, 22, 26 and 28, capable of affixing potential energy storing means 18, 24 to other components of the apparatus of the present invention, are known and commercially available. For example, standard bolts may be used for these purposes. Consequently, a practitioner in the art is capable of choosing and implementing appropriate attachment means 20, 22, 26 and 28. The other component-to-component attachments discussed in this description may also be accomplished using known and commercially available attachment means.

A set of spacers 29 is used in combination with horizontally oriented potential energy storing means 24 and attachment means 26 and 28. Similarly, a set of spacers 23 is used in combination with vertically oriented potential energy storing means 18 and attachment means 20 and 22. Any configuration of spacers 23, 29 capable of functioning in a similar manner to those of the preferred embodiment described below may be employed in the practice of the present invention. Preferably, spacers 23 are formed from steel, with six, single aperture spacers 23 employed for each vertically oriented potential energy storing means 18. Spacers 29 are preferably formed from steel, with two, dual aperture spacers 29 preferably employed for each horizontally oriented potential energy storing means 24. Spacers 23 and 29 useful in the practice of the present invention are known and commercially available. A practitioner in the art would be able to choose or design and implement appropriate spacers 23 and 29.

Metallic members 30, 42 of the present invention may be ferrous blocks, as shown in FIGS. 1 and 2. Metallic members 30, 42 may also be configured in any other convenient shape, so long as they are capable of operating in combination with electromagnetic coils 32, 34 to generate a component of the vibratory motion of vibratory surface 16 in a specific plane. Moreover, outer frame 12 or support frame 14 may be used as metallic members in vibratory mechanisms 10 of the present invention and operate directly in combination with coils 32 or 34 to generate vibratory motion of vibratory surface 16. Alternatively, as mentioned above, metallic members 30 may be provided as permanent magnets or electromagnets in embodiments wherein a single coil is used to displace the surface in both the first and second directions in a horizontal plane.

Metallic member 30 may, for example, be a metallic member of about 3.0 inches long, about 1.1 inches wide and about 0.5 inch thick, having two offset openings therethrough. Each opening of tis embodiment of metallic member 30 is positioned at about 0.75 inch from a widthwise wall of member 30 and 0.3 inch from the lengthwise wall thereof. The openings are preferably separated from each other by a widthwise distance of about 0.5 inch and a lengthwise distance of about 1.5 inches.

Metallic member 42 may, for example, be a metallic member of substantially the same size as metallic member 30, having two openings disposed in substantially the same manner as metallic member 30 as well as three additional openings. The three additional openings are aligned along the widthwise center line of this embodiment of metallic member 42 and are separated from each other and the widthwise walls of member 42 by a distance of about 0.75 inch. Preferably, the central opening (of the three aligned additional openings) passes completely through metallic member 42, while the two peripheral aligned additional openings do not.

Metallic members of the present invention may be formed of any material capable of operating in combination with coils 32, 34. Suitable metallic members are formed of iron, steel, or the like. Especially preferred metallic members 30 and 42 are blocks formed of laminated iron or steel. The lamination functions to concentrate the magnetic field generated by coils acting in the horizontal and vertical planes. Also preferably, metallic member 30 is attached to outer frame 12 through a block-type armature base 108 (FIG. 1), preferably formed of aluminum. A practitioner in the art is capable of designing or choosing as well as implementing appropriate metallic members 30, 42.

Preferably, horizontal coil(s) 32 and vertical coil(s) 34 are configured to cooperate with metallic blocks 30, 42 or metallic surfaces 12, 14 to impart vibratory motion in two planes. Any coils 32, 34 capable of such cooperation may be employed in the practice of the present invention. For example, a two horizontal coil 32/two vertical coil 34 embodiment of the present invention will generate two dimensional vibratory motion as will a two horizontal coil 32/single vertical coil 34 embodiment.

Figure 10A:
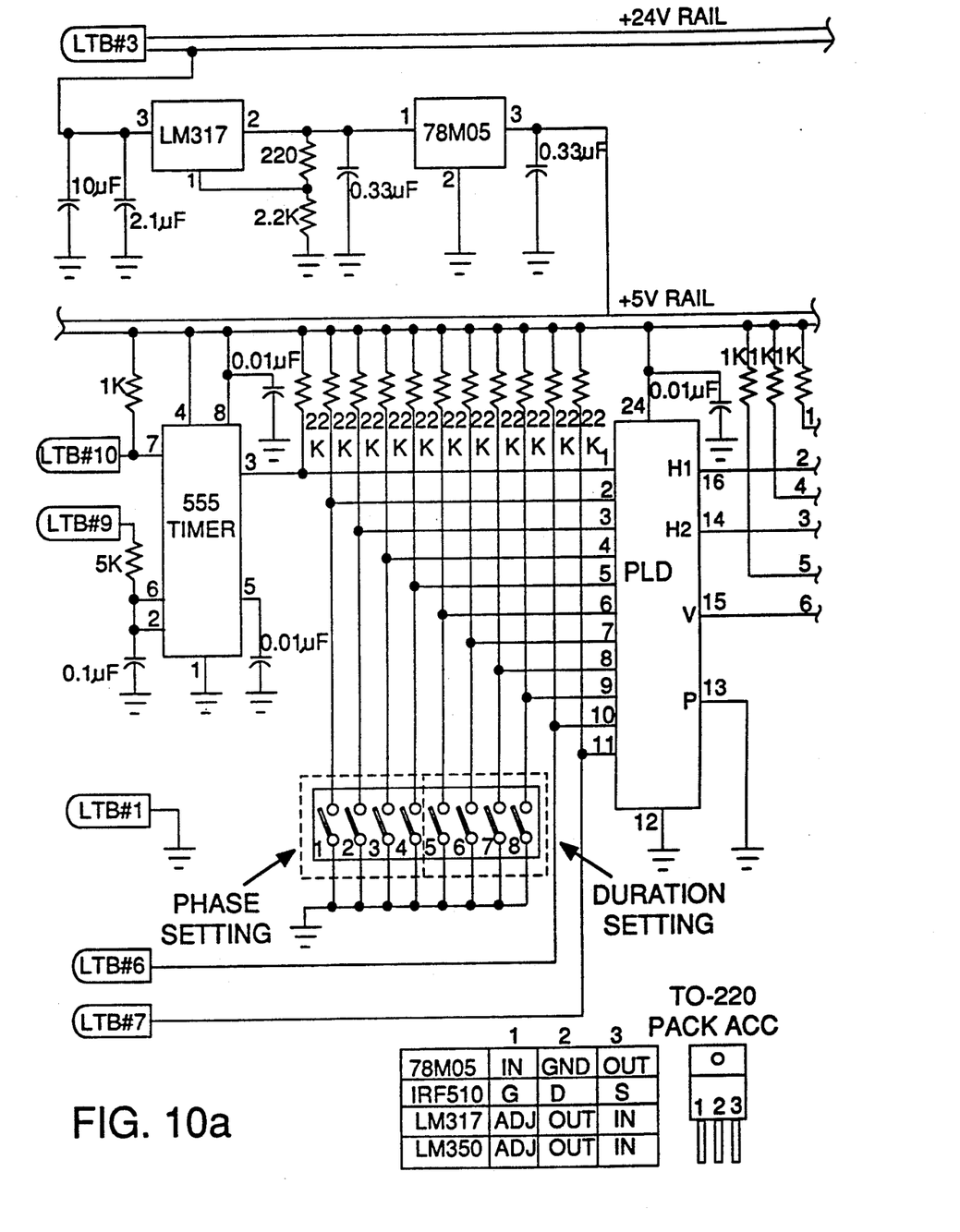
FIGS. 10a and 10b, in combination, constitute a schematic representation of a preferred control mechanism for use in the practice of the present invention.
Figure 10B:
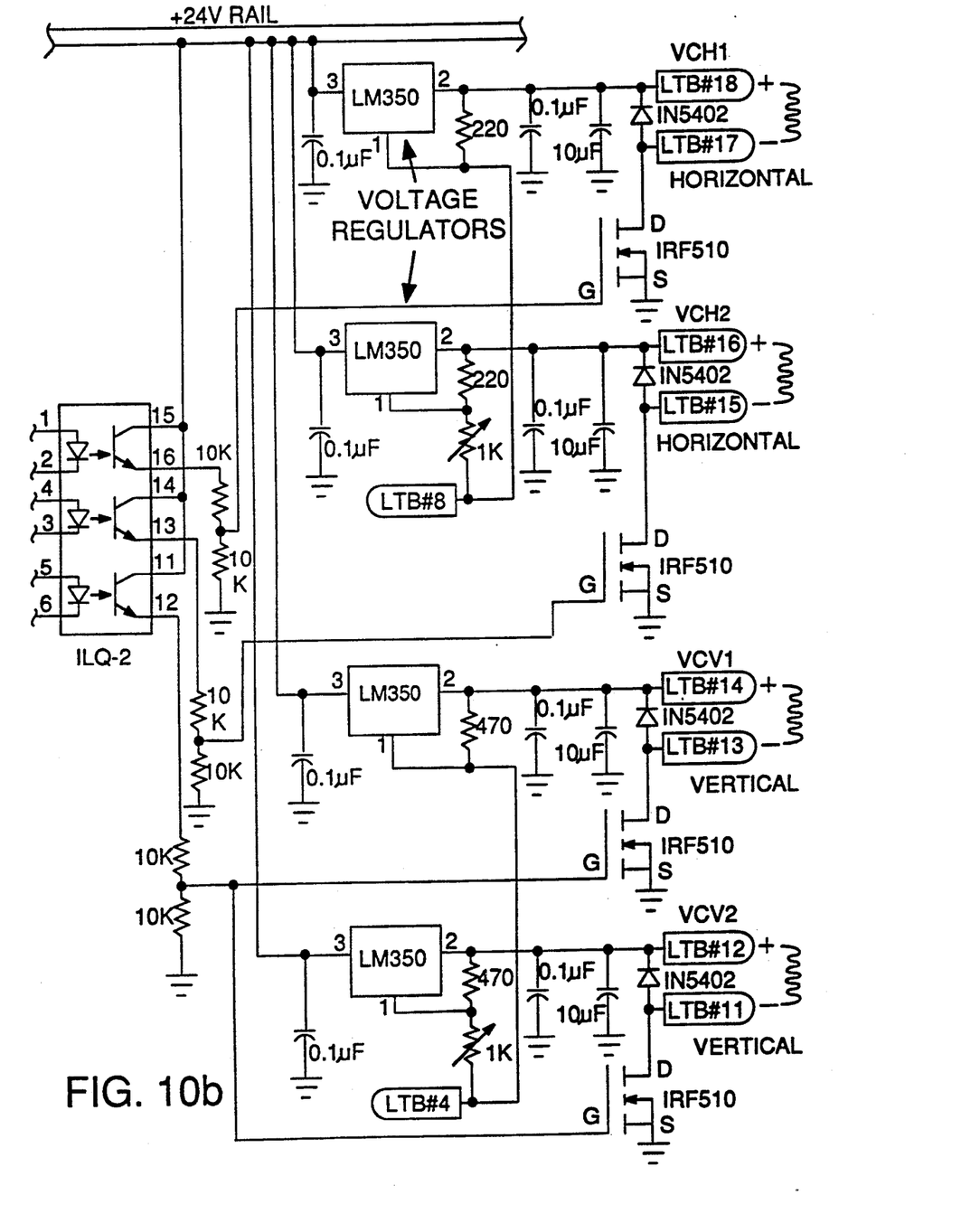

FIGS. 10a and 10b, in combination, illustrate a preferred control mechanism. Horizontal and vertical coils are driven by power field effect transistors (FETs). Suitable FETs and coil configurations are well known and commercially available. Preferred coils and FETs include coils manufactured by Magne-Tek Controls (Part No. 3330 SER 02-1261) driven by International Rectifier HexFet transistor #IRF510. Various embodiments of horizontal and vertical coils as well as drive transistors are known in the art and would be suitable for use in the practice of the present invention. A practitioner in the art would be able to implement coils and drivers therefor in accordance with the present invention.

Phase related signals are generated by means of a Programmable Logic Device (PLD), preferably the Lattice Semiconductor Corporation PEEL22V10. Similar devices capable of supporting the necessary logic and term loading, such as the Lattice GAL6001 or the ICT PEEL-26CV12, are also suitable. The preferred control mechanism of the present invention permits the drive frequency of the coils to be altered without affecting the phase relationship between the horizontal and vertical coils. Because both horizontal and vertical signals are derived from the number of base clock pulses and not the frequency of the base clock signal, the base clock signal frequency may vary and the phase and duration relationships of both the horizontal and vertical signals will not be affected. More specifically, the phase relationship between the horizontal and vertical coils in this preferred embodiment of the present invention tracks the drive frequency.

A 555 timer IC is used to establish a base reference frequency for the PLD of, for example, two kilohertz. Input is provided to adjust this frequency within 10%. Adjustment is provided to tune the drive system to the resonance of a mechanical handler loaded with parts.

Inputs are also provided for manual activation of both the forward and backward drive signals, and these inputs are directly connected to the signal generating PLD.

Local to the PLD are nine additional inputs: four for phase offset, four for duration offset, and one for polarity setting. The two groups of four inputs are interpreted by the PLD as binary values, ranging from 0 to 15 (0000 to 1111). These switches are set to match the desired start (PHASE) and stop (DURATION) clock pulses relative to the base clock frequency for the vertical motion control signal.

Drive signals for coils 32 and 34 are preferably optically isolated from the driver FETs to prevent damage to the PLD. The drive signals for the two horizontal coils 32, HOR-1 and HOR-2, in a preferred embodiment of the present invention, are 32 base clock pulses long, 50% duty cycle and 180° phase related. Both horizontal drive signals are activated from an exclusive OR of forward/reverse inputs. The drive signal for vertical coil 34 can start anywhere from two clock pulses prior to the HOR-1 rising edge to two clock pulses prior to the HOR-1 falling edge. As a result, the vertical signal has 16 possible start points, as prescribed by the 4 PLD inputs relating to the phase offset as described above. The duration of the vertical signal can be any number of clock pulses remaining between where it started and two clock pulses prior to the HOR-1 falling edge. Consequently, the vertical signal has 16 possible stop points as prescribed by the 4 PLD inputs relating to phase duration as described above.

Figure 9:
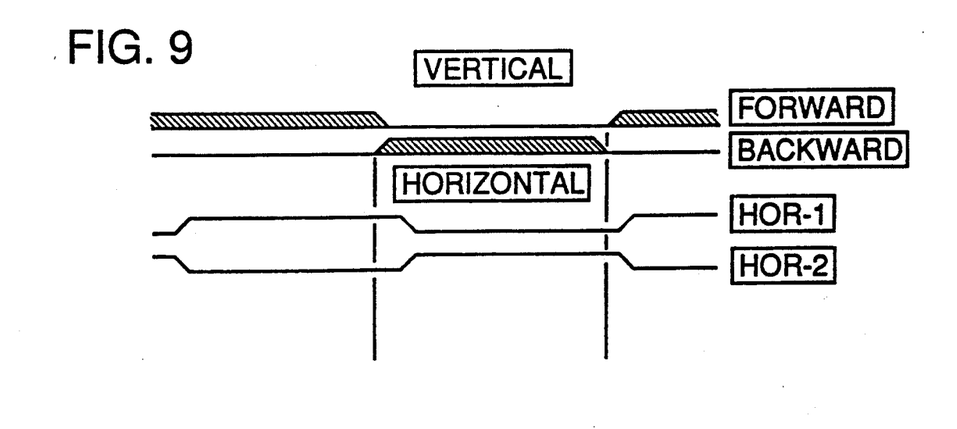
FIG. 9 is a phase relationship diagram showing both forward and rearward vertical signals with respect to horizontal signals employed by a two horizontal coil, one vertical coil embodiment of the apparatus of the present invention to generate reversible part movement.

In operation, vibrating mechanism 10 of the present invention vibrates vibratory surface 16 as generally described below. Motions are generated by means of phase and amplitude related signals driving electromagnetic coils in two axes, horizontal and vertical. The amplitude of the signals is directly proportional to the amount of force applied to the parts being transported, and the phase relationship between the horizontal and vertical signals is related to the direction of part vibration. FIG. 9 is a phase relationship diagram depicting the relationship of forward and rearward vertical signals generated by a single vertical coil 34 to horizontal signals generated by two horizontal coils 32. The black areas of FIG. 9 represent the adjustable domain.

In the embodiment depicted in FIG. 9, the forward vertical signal starts about two clock pulses before the HOR-1 rising edge and stops about one clock pulse prior to the HOR-1 falling edge. In addition, the depicted rearward or backward vertical drive signal starts about two clock pulses prior to the falling edge of HOR-1 and ends about one clock pulse from the HOR-1 rising edge.

When energized, coils 32, 34 attract metallic members 30, 42, metallic outer frame 12, metallic support frame 14 or vibratory surface 16 itself, if it is formed from a suitable material. Vertically and horizontally oriented potential energy storing means 18, 24 aid in flexibly interconnecting vibratory surface 16 to a more massive support structure 40 of the apparatus of the present invention, thereby storing potential energy when coils 32, 34 are energized. When coils 32, 34 are de-energized, potential energy storing means 18, 24 release the potential energy stored therein and move vibratory surface 16 toward its initial location. The frequency at which coils 32, 34 are energized and de-energized is preferably substantially similar to the resonant frequency of vibratory surface 16/potential energy storing means 18, 24 system. During these vibratory motion generating operations, no vibratory mechanism 10 component movement occurs, other than a small vibrational movement of potential energy storing means 18, 24.

Figures 6, 7:
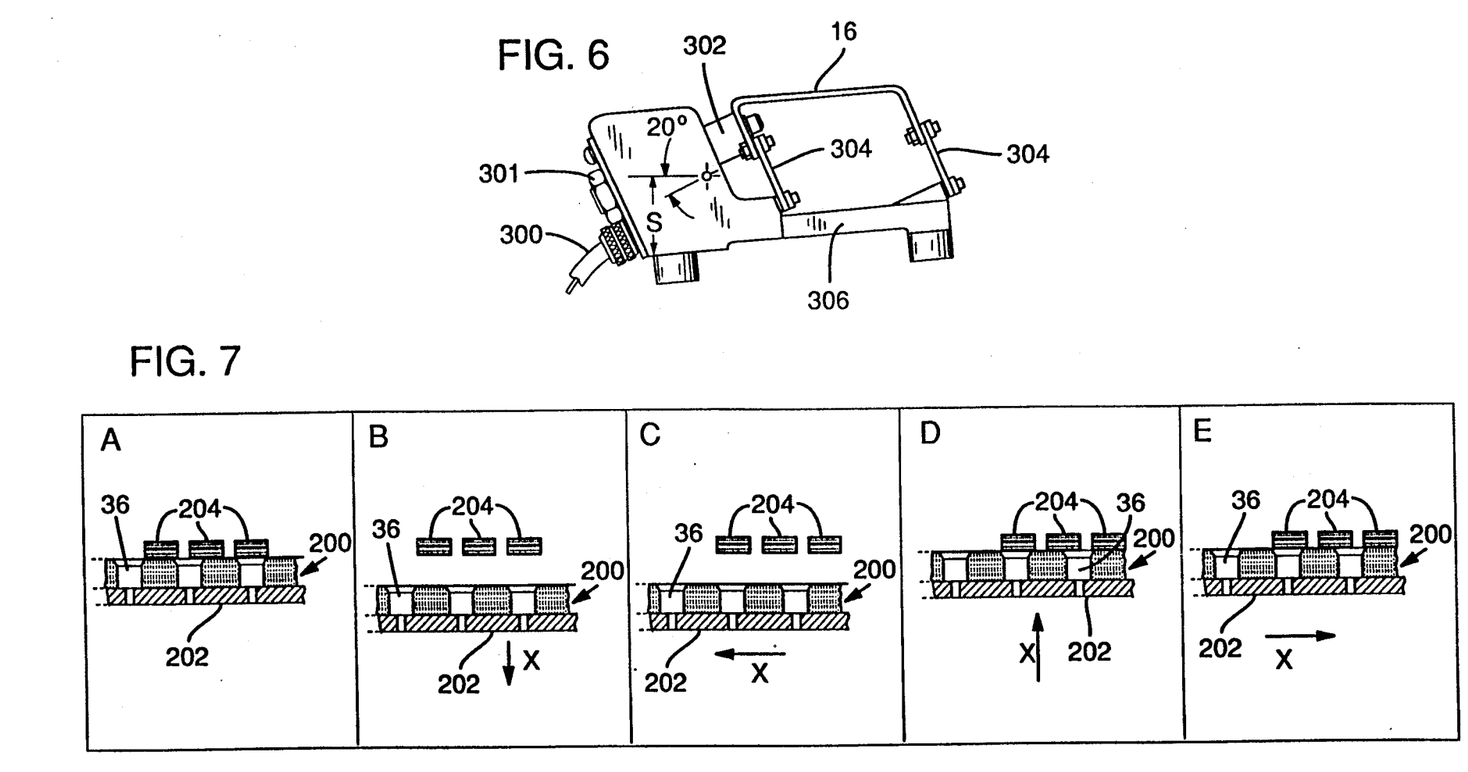
FIG. 6 is a side view of a unidirectional or single dimensional vibratory apparatus of the present invention.
FIG. 7 is a schematic representation of a part movement conducted by a two directional component vibration embodiment of the apparatus of the present invention.

More specifically, a method of moving parts along vibratory surface 16 in the embodiment of the present invention depicted in FIG. 1 is shown in FIG. 7. Frame A of FIG. 7 depicts a vibratory surface 16 (a carrier plate 200 having a floor 202 and orifices 36) at rest in an original spatial location, with a plurality of parts 204 deployed thereupon.

Vertical coils 34 are energized and, as shown in Frame B of FIG. 7, act to draw carrier plate 200 downward in the direction indicated by an arrow X. In this manner, carrier plate 200 is displaced from beneath parts 204, rendering parts 204 airborne. Energized horizontal coils 32 then horizontally and rearwardly displace carrier plate 200 from its position below airborne parts 204, as indicated by arrow X in Frame C of FIG. 7. When vertical coils 34 are de-energized, carrier plate 200 moves in the direction indicated by arrow X in Frame D of FIG. 7 and returns into contact with parts 204 through the action of vertically oriented potential energy storing means 18. De-energizing horizontal coils 32 results in the return of carrier plate 200 to its original spatial location (Frame A) in the direction indicated by arrow X in Frame E of FIG. 7 through the action of horizontally oriented potential energy storing means 24. Parts 204 travel forward along with carrier plate 200 during this horizontal return. This stepwise mechanism transports parts 204 linearly along vibratory surface 16.

The present invention also provides methods for orienting and loading parts into orifices 36 located on either vibratory surface 16 or a surface, such as a carrier plate, attached thereto using vibration. Vibratory mechanism 10 shown in FIG. 1 may be used for these purposes, thereby transporting parts, while orienting and loading them using an uncomplicated mechanism.

Vibratory surface 16 of the present invention may include a plurality of orifices 36 (FIG. 1) formed therein. Alternatively, a second surface or plate (FIG. 7) in which orifices 36 are formed may be removably attached to vibratory surface 16. Orifice 36 configuration is chosen to select parts of appropriate size and orientation for subsequent processing or packaging. While the parts are undergoing motion generated by vibratory mechanism 10, such parts will deploy within orifices 36, if their size and orientation match those of orifices 36. The vibrating parts flow evenly across the full width of the orificed vibratory surface 16 in a wave form, contacting all areas of vibratory surface 16. In this manner, parts pars over orifices 36 and fill them. No rocking or tilting of the components of the apparatus of the present invention supporting vibratory surface 16 by human or automated means is necessary.

If necessary to deploy parts in all orifices 36 or to deploy all parts, the parts can be transported across vibratory surface 16 or a surface attached thereto more than once, as is described more fully below. From orienting orifices 36, the parts may be transferred and loaded into a secondary carrier. In the alternative, vibratory surface 16 or the surface attached thereto having parts disposed therein may be removed from the apparatus of the present invention, vibratory surface 16 or the adjacent surface now serving as a vehicle for the oriented parts. A practitioner in the art is capable of implementing a proper orienting and/or loading protocol.

Although parts may be sorted through holes of varying sizes in the vibratory surface as described below, it is impossible to guarantee that smaller parts will not fall into larger part sized holes. A preferred sorting method therefore begins with a vibratory surface having orifices matching the smallest parts to be sorted. After passing parts over this surface one or more times to segregate the small parts, a second vibratory surface with larger orifices replaces the first. The parts are then passed over this surface one or more times to segregate the larger parts. In this fashion, a mixture of parts from two different sized lots may be sorted quickly and gently.

While the parts are undergoing motion generated by vibratory mechanism 10 of the preferred embodiment of the present invention, a part will pass through a sorting orifice 36, if its geometry is such that the surface area of the part exposed to orifice 36 is smaller than the area of orifice 36. As a result, orifice 36 configuration is chosen to select geometrically appropriate parts for subsequent processing or packaging. The remaining (i.e., non-passed through) parts will continue to move along vibratory surface 16, passing through subsequent orifices 36 in the same manner. At the completion of this process, parts have been arranged by geometry and can proceed to further processing or packaging on that basis. A practitioner in the art is capable of implementing an appropriate sorting and/or loading protocol.

In this fashion, parts may be oriented or sorted while being transported along vibratory surface 16. The transport, orientation and sorting take place automatically, and apparatus of the present invention can therefore be used in autonomous machinery.

Part movement generated by apparatus of the present invention is linear, and the direction of that part movement can be altered as needed to achieve a goal, such as completely filling orifices 36 present in a carrier plate. Directional part movement is generated by applying horizontal and vertical components of vibration to vibratory surface 16 at offset phases. Vibration is applied by means of electromagnetic coils 32, 34. Coils 32, 34 are driven by a controller that provides sequentially generated horizontal and vertical coil 32, 34 energization/de-energization or energization/opposed energization signals responsive to an adjustable timer (not shown) which maintains the optimum horizontal and vertical frequencies regardless of the amplitude of vibration. If the generated vibratory motion is of sufficient magnitude, the parts will "dance" or randomly orient while in motion along vibratory surface 16.

Figure 8:
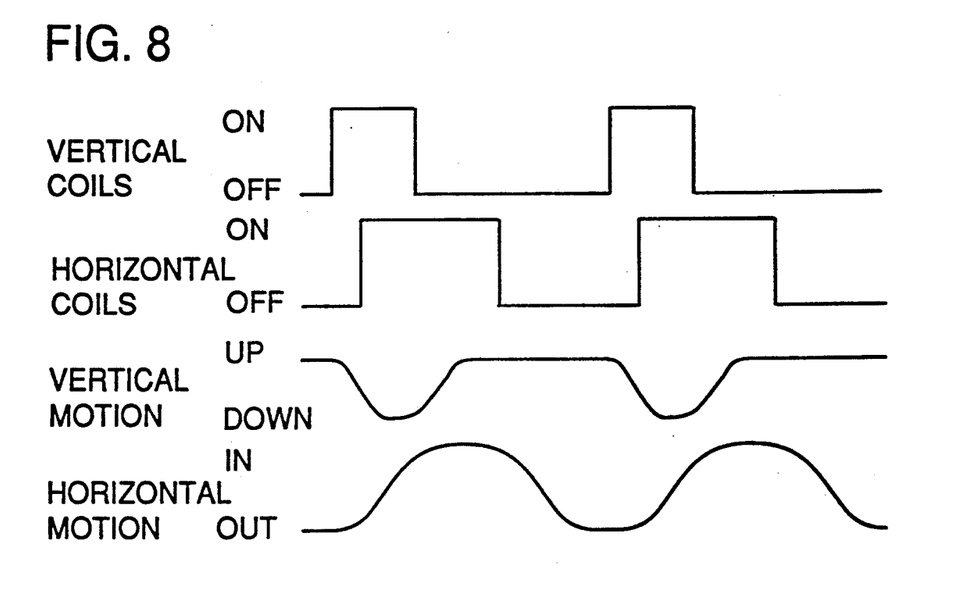
FIG. 8 is a graphical representation of horizontal and vertical coil energization/de-energization patterns employed by an apparatus of the present invention in generating movement of parts along the transport plane in a specific, but alterable direction having the depicted horizontal and vertical motion components.

Varying the direction of part movement is accomplished by changing the phase relationship of the horizontal and vertical coil/armature interactions, as shown in FIG. 8. The uppermost signal shown in FIG. 8 corresponds to the energization (i.e., "on" states) and de-energization (i.e., "off" states) of vertical coils 34. Similarly, the next lower signal shown in FIG. 8 corresponds to the energization (i.e., "on" states) and de-energization (i.e., "off" states) of horizontal coils 32. FIG. 8 also indicates the vertical (penultimate signal shown) and horizontal (ultimate signal shown) components of part motion, resulting from the depicted energization/de-energization patterns of coils 32, 34.

For example, both rearward and forward part movement capability is desirable to insure that all orifices 36 become filled with parts during orientation/loading procedures or to insure that all parts have passed through an appropriate orifice 36 during sorting procedures. Reversible movement is also desirable for returning parts to their initial location. This is an important application of the vibratory sorting apparatus of the present invention.

One embodiment of the present invention, shown in FIG. 6, involves only one coil or one set of coils disposed to generate only single component (unidimensional) vibratory motion when energized through a power supply cable 300. Apparatus of this embodiment of the present invention may employ coil energization/de-energization or coil energization/opposed energization patterns. In order for vibratory surface 16 to impart directional motion to parts disposed thereupon in such a single component vibration embodiment of the present invention, the coil(s) 301, metallic member(s) 302, or a portion of vibratory surface 16 itself, and potential energy storing means 304 are operably connected to function along a plane disposed at an angle between horizontal and vertical. Preferably this angle is from about 10° to about 30°, more preferably about 20°. Vibratory surface 16 of this single component vibratory apparatus is substantially horizontal to prevent parts from moving solely as a result of gravity. Vibration is then generated along the coil/potential energy storing means axis (in the plane of single component vibration), while vibratory surface 16 is maintained in its initial (substantially horizontal) orientation with respect to a base 306. A practitioner in the art is capable of implementing a vibratory apparatus of this embodiment of the present invention.

Figure 11:
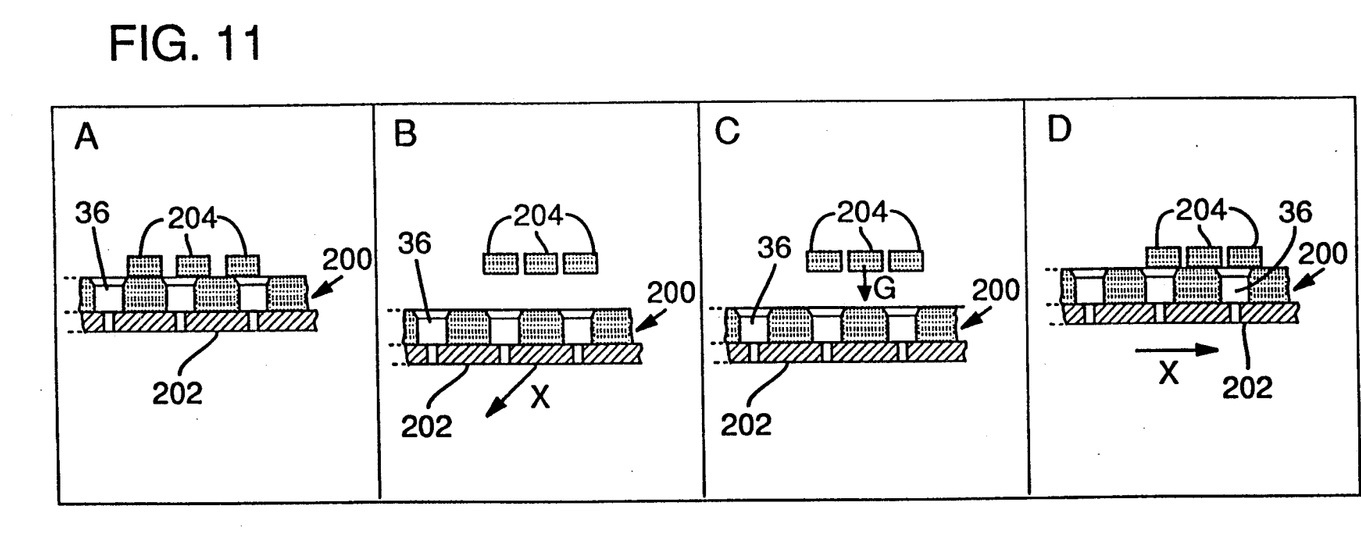
FIG. 11 is a schematic representation of a mechanism of part movement conducted by a one directional vibration embodiment of the present invention.

In operation of apparatus of this embodiment of the present invention, a mechanism of part movement shown in FIG. 11 is observed. Parts 204 initially lay immobile at an initial location on carrier plate 200, for example, as shown in Frame A of FIG. 11. When the coil is energized, carrier plate 200 is retracted a small distance from the parts in a direction indicated by arrow X in Frame B of FIG. 11, rendering parts 204 airborne. Gravity then acts on parts 204 in a direction indicated by arrow G in Frame C of FIG. 11, causing them to strike carrier plate 200 at locations horizontally displaced from their initial locations (Frame A). The coil is then de-energized and the potential energy storing means returns to its original configuration by traveling in the direction indicated by arrow X in Frame D of FIG. 11, thereby returning carrier plate 200 to its original spatial location (Frame A). Horizontally displaced parts 204 are transported linearly along with carrier plate 200 during this return operation. This cycle is repeated numerous times per second, moving the parts along vibratory surface 16. Additionally, if the generated vibrations are of sufficient magnitude, the parts will "dance" or randomly orient while in motion along the surface One disadvantage of this embodiment is that the part motion is induced in one direction only and directional reversibility cannot be achieved.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. An apparatus for reversibly transporting parts along a surface comprising:
    an electromagnetic coil oriented in a horizontal plane capable of displacing the surface in a first direction in the horizontal plane;
    a means for displacing the surface in a second direction in the horizontal plane, where the second direction is substantially opposite to the first direction in the horizontal plane;
    an electromagnetic coil oriented in a vertical plane capable of displacing the surface in a first direction in the vertical plane; and
    a means for displacing the surface in a second direction in the vertical plane, where the second direction is substantially opposite to the first direction in the vertical plane,
    thereby generating bidirectional part movement along the surface.

2. An apparatus according to claim 1 comprising two electromagnetic coils oriented in a horizontal plane and driven at a 180° phase angle offset.

3. An apparatus according to claim 1 wherein the means for displacing the surface in a second direction in the horizontal plane comprises horizontally disposed potential energy storing means.

4. An apparatus according to claim 3 wherein the horizontally disposed potential energy storing means comprises a horizontally oriented leaf spring.

5. An apparatus according to claim 1 wherein the means for displacing the surface in a second direction in the vertical plane comprises vertically disposed potential energy storing means.

6. An apparatus according to claim 5 wherein the vertically disposed potential energy storing means comprises a vertically oriented leaf spring.

7. An apparatus according to claim 1 wherein the surface is characterized by a plurality of orifices configured to accept parts in a single orientation only.

8. An apparatus according to claim 1 wherein the means for displacing the surface in a second direction in the horizontal plane is a coil disposed in the horizontal plane.

9. An apparatus according to claim 1 additionally comprising a clamp means for removably holding the surface.

10. An apparatus according to claim 1, wherein the means for displacing the surface in a second direction in the vertical plane is a second coil disposed in the vertical plane.

11. An apparatus according to claim 1, wherein the surface has a plurality of apertures sized to hold individual parts.

12. An apparatus according to claim 1 additionally comprising control means permitting modification of a drive frequency without affecting the phase relationship between the electromagnetic coils oriented in the horizontal and vertical planes.

13. An apparatus of claim 12 wherein the electromagnetic coil is oriented in a plane offset from the horizontal by an angle of about 20°.

14. An apparatus of claim 12 wherein the means for displacing the surface in a second direction in the plane of the offset angle comprises a potential energy storing means disposed in the plane.

15. An apparatus according to claim 13 wherein the potential energy storing means disposed in the plane of the offset angle comprises a leaf spring oriented in the plane.

16. An apparatus according to claim 12 wherein the means for displacing the surface in a second direction in the plane of the offset angle is a coil disposed in the plane.

17. An apparatus of claim 12 wherein a single coil displaces the surface in the first and second directions in the plane of the offset angle.

18. A method of reversibly transporting and manipulating parts comprising:
    providing a surface configured to permit part manipulation; and
    maneuvering the surface by repeatedly performing the sequence:
        displacing the surface in a first direction in the vertical plane;
        displacing the surface in a first direction in the horizontal plane;
        displacing the surface in a second direction in the vertical plane, where the second direction is substantially opposite to the first direction in the vertical plane; and
        displacing the surface in a second direction in the horizontal plane, where the second direction is substantially opposite to the first direction in the horizontal plane,
    thereby generating bidirectional part movement along the surface to facilitate manipulation of the parts in accordance with the surface, configuration.

19. A method of claim 18 wherein the surface is characterized by a plurality of orifices configured to accept parts deployed in a single orientation only, thereby achieving orientationspecific part loading.

20. A method of claim 18 wherein all of the steps are conducted for a first surface configured to permit orientation of parts of a first specific size or configuration and a second surface configured to permit orientation of parts of a second specific size or configuration, thereby sorting parts according to size or configuration.

* * * * *